MILLER & GRUBB.
Wagon-Brake.
No. 41,315. Patented Jan. 19, 1864.
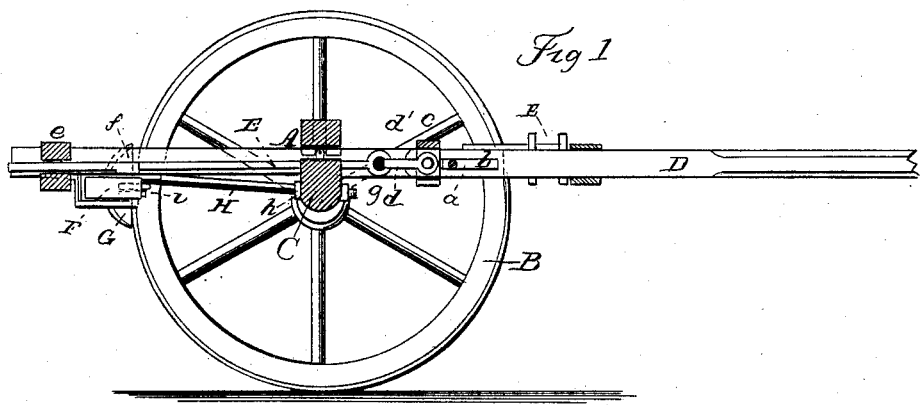
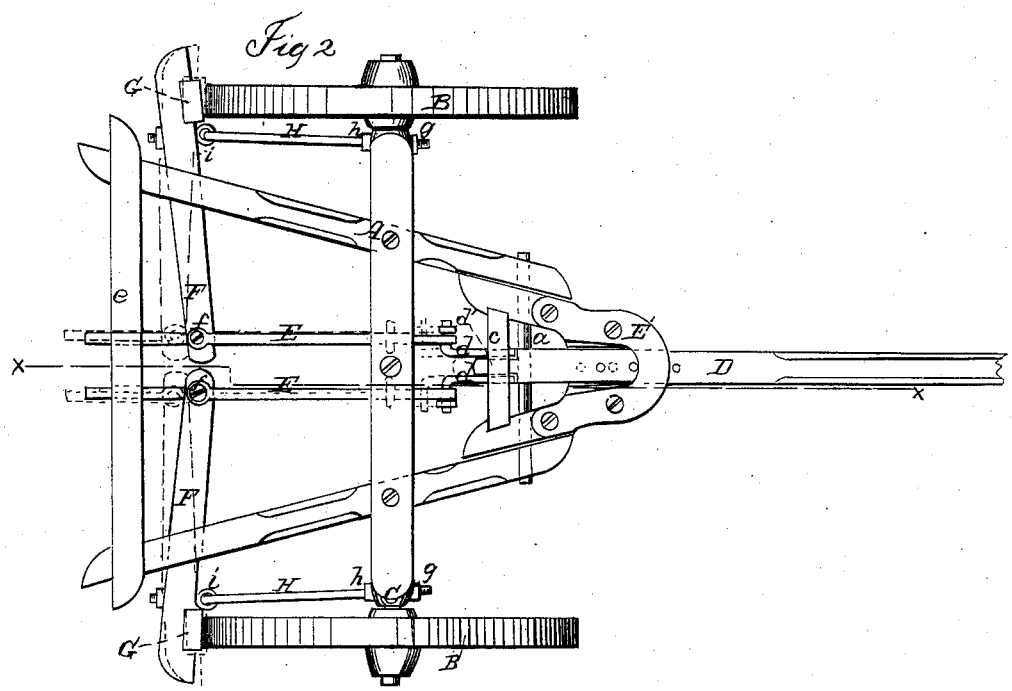
Witnesses.
J W Coombs
G W Reed
Inventors,
S H Miller
E Grubb
per Munn
atty

UNITED STATES PATENT OFFICE.

SAMUEL H. MILLER AND EDMUND GRUBB, OF LIBERTY, ILLINOIS.

IMPROVEMENT IN WAGON-BRAKES.

Specification forming part of Letters Patent No. 41,315, dated January 19, 1864.

*To all whom it may concern:*

Be it known that we, SAMUEL H. MILLER and EDMUND GRUBB, both of Liberty, in the county of Adams and State of Illinois, have invented a new and Improved Wagon-Brake; and we do hereby declare that the following is a full, clear, and exact description of the same, reference being had to the accompanying drawings, forming a part of this specification, in which—

Figure 1 represents a longitudinal vertical section of this invention, taken in the plane indicated by the line $x$ $x$, Fig. 2. Fig. 2 is a plan or top view of the same.

Similar letters of reference indicate corresponding parts in both views.

The object of this invention is to produce a brake for wheel-vehicles which will operate automatically whenever the vehicle crowds upon the draft animals, and which will release the wheels as soon as a strain in a forward direction is exerted on the draft-pole.

To enable those skilled in the art to make and use my invention, I will proceed to describe it with reference to the drawings.

A represents the frame of a wagon or other vehicle, which runs on wheels B, that are attached to the axle C. D is the draft-pole, which is guided by the hounds E', said hounds being secured to the frame A by means of a pivot or bolt, $a$. This bolt passes through a slot, $b$, in the draft-pole, leaving the latter free to slide in a longitudinal direction to the extent of said slot. The draft-pole rises and falls with the hounds, and its rear end is guided in a slotted cross-bar, $c$, which extends across the rear end of the hounds. $d'$ is the equalizer, which has its fulcrum on a pivot in the rear end of the draft-pole, and which connects by links $d$ $d$ with bars E, which slide backward and forward in grooves in the upper surface of the axle C, and in sockets in the cross-bar $e$ of the frame A. These sliding bars connect by means of pivots $f$ with the inner ends of the brake-beams F, the outer ends of which bear the shoes G. By forcing these shoes up against the circumference of the wheels B the operation of braking is effected.

The brake-beams F are suspended by means of staples or eyebolts $i$ from fulcrum-bars H, which extend from the axle C, to which they are secured each by two nuts, $g$ $h$. By releasing the nuts $h$ and tightening the nuts $g$ the shoes G are brought closer up to the peripheries of the wheels than before, and by releasing the nuts $g$ and tightening the nuts $h$ the shoes are removed from the peripheries of the wheels; and furthermore, by diminishing the distance between the fulcrum-bars H and the pivots $f$ the leverage of the brake-beams is diminished, and vice versa. If by these means the shoes have been adjusted to the desired position, a strain on the draft-pole in a backward direction will apply the brake, and a strain in a forward direction will take the brakes off. When the brake is applied, the draft pole is free to rise and fall without interfering with or being interfered with by the operation of the brake, the links $d$ $d$ permitting said draft-pole to adjust itself.

By the application or use of the equalizer $d'$, the brake is allowed to adapt itself to the inequalities of the wheels and the draft-pole remains steady. Without this equalizer the draft-pole is thrown violently first one way and then the other whenever one of the shoes comes opposite to a low or high place in one of the wheels, and thereby the brake becomes worse than useless.

The adjustable fulcrum-bars are indispensable for the correct operation of our brake. Without it one of the shoes might bear hard on its wheel, while the other does not touch the circumference of its wheel, and the action of the brake would be uncertain.

Our brake can be applied with little expense to any wheel-vehicle whatever; its operation is sure, it is not liable to get out of repair, and it can easily be adjusted.

We do not claim, broadly, the connection of pivoted brake-arms with the tongues of vehicles; but,

Having thus fully described our invention, what we claim as new, and desire to secure by Letters Patent, is—

The combination of the equalizer $d'$ and guide-bar C with the rear end of the sliding tongue D and with the brake-beams F and adjusting fulcrum-bars H, as and for the purpose herein shown and described.

SAMUEL H. MILLER.
EDMUND GRUBB.

Witnesses:
B. F. GROVER,
M. R. BUTTZ.